United States Patent
Wada

(10) Patent No.: US 8,199,230 B2
(45) Date of Patent: Jun. 12, 2012

(54) SIGNAL PROCESSING APPARATUS, IMAGE PICKUP APPARATUS AND COMPUTER READABLE MEDIUM

(75) Inventor: Tetsu Wada, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 925 days.

(21) Appl. No.: 12/163,762

(22) Filed: Jun. 27, 2008

(65) Prior Publication Data

US 2009/0015693 A1 Jan. 15, 2009

(30) Foreign Application Priority Data

Jun. 28, 2007 (JP) ................................ P2007-170448
Jun. 26, 2008 (JP) ................................ P2008-166710

(51) Int. Cl.
*H04N 9/083* (2006.01)
*H04N 1/46* (2006.01)
*G06K 9/32* (2006.01)

(52) U.S. Cl. ........ 348/277; 348/279; 348/276; 348/272; 382/300; 358/525

(58) Field of Classification Search .......... 348/272–283; 382/300; 358/525
See application file for complete search history.

(56) References Cited

U.S. PATENT DOCUMENTS 6,476,865 B1 * 11/2002 Gindele et al. ............... 348/277
6,930,711 B2 * 8/2005 Fukui et al. ............... 348/225.1

FOREIGN PATENT DOCUMENTS

JP 10-136391 A 5/1998
JP 2001-101398 A 4/2001

* cited by examiner

*Primary Examiner* — Sinh Tran
*Assistant Examiner* — Mark Monk
(74) *Attorney, Agent, or Firm* — Birch, Stewart, Kolasch & Birch, LLP

(57) ABSTRACT

A signal processing apparatus includes a synchronization processing unit for processing image pickup signals including three kinds of signals and luminance signals output from an image pickup device. The synchronization processing unit is used to interpolate other color signals than the above-mentioned respective color signals at pixel positions where the three kinds of signals respectively exist. This processing includes a luminance use estimating processing which estimates color signals to be interpolated at the above-mentioned pixel positions using not only the same kinds of color signals as the above-mentioned color signals to be interpolated but also the above-mentioned luminance signals respectively existing around the above-mentioned pixel positions.

15 Claims, 5 Drawing Sheets

SIGNAL PROCESSING APPARATUS, IMAGE PICKUP APPARATUS AND COMPUTER READABLE MEDIUM

CROSS-REFERENCE TO RELATED APPLICATIONS

This application is based on and claims priority under 35 USC 119 from Japanese Patent Application No. 2007-170448 filed Jun. 28, 2007 and No. 2008-166710 filed Jun. 26, 2008; the entire contents of which are incorporated herein by reference.

BACKGROUND

1. Technical Field

The present invention relates to a signal processing apparatus for processing an image pickup signal including two or more kinds of color signals and luminance signals which are respectively output from image pickup elements.

2. Related Art

In an image sensor of a single plate type having a color filter of a Bayer matrix, since only one color component signal can be obtained from each of a large number of photoelectric conversion elements included in the image sensor, it is necessary to carry out a so called synchronizing processing in which, at pixel positions that correspond to the respective ones of the large number of photoelectric conversion elements, there are interpolated the color signals that cannot be obtained from these photoelectric conversion elements. The synchronizing processing is a processing which interpolates color signals originally not existing at the pixel positions using color signals existing around such pixel positions and, therefore, there is a possibility that a false color can occur. In the patent reference 1 (JP-A-2001-101398), there is disclosed a method which can reduce the false color whatever the color may be.

FIG. 5 is a view of the arrangement of color signals which are obtained from a single plate type of image sensor having a color filter of a Bayer arrangement.

Circles shown in FIG. 5 express color signals respectively: specifically, a circle with "R" stated therein expresses a red color signal; a circle with "G" stated therein expresses a green color signal; and, a circle with "BB" stated therein expresses a blue color signal. On the respective color signals, there are given numbers (01~16) which express pixel positions respectively.

When enforcing a synchronizing processing on such image pickup signals as shown in FIG. 5 using a method disclosed in the patent reference 1, the calculation of an R signal (R10) to be interpolated at an pixel position 10 of a 0 signal in a line of B and G signals is carried out according to the operation of R10=G10+(R09−G09) based on the premise that, when an object is assumed to have a correlation in the vertical direction, differences between R signals and 0 signals in the local area of an image are equal to each other, that is, based on the premise that there holds the relationship, R10−G10=R09−G09. In this case, a 0 signal (G09) at an R09 pixel position is calculated by enforcing a one-dimensional interpolation calculation on a G signal on an RG line where the R09 pixel position 09 exists, for example, G09=(G05+G13)/2.

In this manner, a color signal (for example, R10) to be interpolated at an arbitrary pixel position (for example, a pixel position 10) is estimated using (i) a G signal (G10) existing at the arbitrary pixel position, (ii) a color signal (R09) which is of the same kind as the color signal to be interpolated and exists at an adjacent pixel position included in a line adjoining a line including the arbitrary pixel portion, and (iii) G signals (G05, G13) respectively existing in the vicinity of the same kind of color signal, thereby reducing the occurrence of the false color effectively.

However, according to the method disclosed in the patent reference 1, when much noise is included in signals G10, G05 and G13, much noise is also included in a signal R10 which is generated using these signals, resulting in the deteriorated image. Also, depending on the colors of an object, a correlation between the R and G signals can be lowered, which can decrease the false color reduction effect. Further, when an object has a correlation in an oblique direction, the signals G and RB lines are arranged alternately and, therefore, the false color reduction effect cannot be expected in a correlation calculation using the G signals.

The present invention aims at solving the above problems found in the above signal processing method. Thus, it is an object of the invention to provide a signal processing apparatus which can enforce a color signal interpolating processing (a synchronizing processing) for reduction of a false color and noise on any signal.

SUMMARY

[1] According to an aspect of the invention, a signal processing apparatus for processing image pickup signal output from image pickup elements and generating color image data, the image pickup signal including three kinds of color signals and luminance signals, the signal processing apparatus includes a synchronization processing unit. The synchronization processing unit disposes signals included in the image pickup signal at respective coordinate positions, and carries out a interpolating processing that interpolates to the three kinds of color signals at the pixel positions which indicate the respective coordinate positions corresponding to pixel data of the color image data to be generated. The interpolating processing of the color signals to be carried out by the synchronization processing unit includes a luminance-use-estimating processing that estimates color signal to be interpolated at each pixel position of each color signal by using (i) the same kind of color signal as the color signal to be interpolated existing around the pixel position of each color signal and (ii) the luminance signals around the pixel position of each color signal.

[2] According to the signal processing apparatus of [1], the image pickup signal includes: first color signals, second color signals and third color signals as the three kinds of color signals; and the luminance signals. The image pickup signal disposed at the respective coordinate positions may be structured such that first lines including some of the luminance signals and the first color signals arranged in a given direction and second lines including the other of the luminance signals, the second color signals and the third color signals arranged in the given direction are arranged alternately in a perpendicular direction perpendicular to the given direction. Each pixel position indicates the position coordinate at which one of the color signals is arranged. The synchronization processing unit interpolates, using the luminance-use-estimating processing, as to each pixel position where the color signal having a correlation in the given direction exists, (i) a first color signal to be interpolated at the pixel position of each second color signal, (ii) a first color signal to be interpolated at the pixel position of each third color signal and (iii) second and third signals to be interpolated in the pixel position of each first signal. The luminance-use-estimating processing is a processing that estimates: (i) the first color signal to be interpolated at the pixel position of each second color signal, using (a) the luminance signal existing in the vicinity of the pixel position of each second color signal and included in the second line including the second color signal existing at the pixel position of each second color signal, (b) the luminance signal existing in the vicinity of the pixel position of each second color signal and included in the first line adjoining the second line, and (c) the first color signal existing in the vicinity of the luminance signal included in the first line adjoining the second line; (ii) the first color signal to be interpolated at the pixel position of each third color signal, using (a) the luminance signal existing in the vicinity of the pixel position of each third color signal and included in the second line including the third color signal existing at the pixel position of each third color signal, (b) the luminance signal existing in the vicinity of the pixel position of each third color signal and included in the first line adjoining the second line, and (c) the first color signal existing in the vicinity of the luminance signal included in the first line adjoining the second line; (iii) the second color signal to be interpolated at the pixel position of each first color signal, using (a) the luminance signal existing in the vicinity of the pixel position of each first color signal and included in the first line including the first color signal existing at the pixel position of each first color signal, (b) the second color signal existing in the vicinity of the pixel position of each first signal and included in the second line adjoining the first line, and (c) the luminance signal existing in the vicinity of the second color signal included in the second line; and (iv) the third color signal to be interpolated at the pixel position of each first color signal, using (a) the luminance signal existing in the vicinity of the pixel position of each first color signal and included in the first line including the first color signal existing at the pixel position of each first color signal, (b) the third color signal existing in the vicinity of the pixel position of each first signal and included in the second line adjoining the first line, and (c) the luminous signal existing in the vicinity of the third color signal included in the second line.

[3] According to the signal processing apparatus of [2], the luminance-use-estimating processing, at the pixel position where the first color signal is to be interpolated, estimates: (i) the first color signal to be interpolated at the pixel position of each second color signal by (a) interpolating a luminance signal at the pixel position where the first color signal to be interpolated, using the luminance signal (a-1) existing in the vicinity of the pixel position of each second color signal and (a-2) included in the second line including a color signal existing at the pixel position of each second color signal, (b) interpolating at a first adjoining-pixel-position which is a pixel position adjoining the pixel position of each second signal in the perpendicular direction, a first color signal using the first color signal existing in the vicinity of the first adjoining-pixel-position and included in the first line including the luminance signal existing at the first adjoining-pixel-position, and (c) adding, to the luminance signal interpolated at the position of each second color signal, a difference between the first color signal interpolated at the first adjoining-pixel-position and the luminance signal existing at the first adjoining-pixel-position; (ii) the first color signal to be interpolated at the pixel position of each third color signal by (a) interpolating a luminance signal at the pixel position of each third color signal, using the luminance signal (a-1) existing in the vicinity of the pixel position of each third color signal and (a-2) included in the second line including a color signal existing at the pixel position of each third color signal, (b) interpolating at another first adjoining-pixel-position which is a pixel position adjoining the pixel position of each third signal in the perpendicular direction, a first color signal using the first color signal existing in the vicinity of the another first adjoining-pixel-position and included in the first line including the luminance signal existing at the first adjoining-pixel-position, and (c) adding, to the luminance signal interpolated at the position of each third color signal, a difference between the first color signal interpolated at the another first adjoining-pixel-position and the luminance signal existing at the another first adjoining-pixel-position; (iii) the second color signal is to be interpolated at the pixel position of each first signal by (a) interpolating a luminance signal at the pixel position of each first color signal, using the luminance signal (a-1) existing in the vicinity of the pixel position of each first signal and (a-2) included in the first line including a color signal existing at the pixel position of each first color signal, (b) interpolating a luminance signal at a second adjoining-pixel-position which is a pixel position where the second color signal (b-1) existing in the vicinity of the pixel position of each first signal and (b-2) included in the second line adjoining the first line, using the luminance signal existing in the vicinity of the second adjoining-pixel-position and included in the second line including the second color signal existing at the second adjoining-pixel-position, and (c) adding, to the luminance signal interpolated at the pixel position of each first position, a difference between (c-1) the second color signal existing at the second adjoining-pixel-position and (c-2) the luminance signal interpolated at the second adjoining-pixel-position; and (iv) the third color signal to be interpolated at the pixel position of each first color signal by (a) interpolating the luminance signal at the pixel position of each first color signal, using the luminance signal (a-1) existing in the vicinity of the pixel position of each first signal and (a-2) included in the first line including the color signal existing at the pixel position of each first color signal, (b) interpolating a luminance signal at a third adjoining-pixel-position which is a pixel position where the third color signal (b-1) existing in the vicinity of the pixel position of each first signal and (b-2) included in the second line adjoining the first line, using the luminance signal existing in the vicinity of the third adjoining-pixel-position and included in the second line including the third color signal existing at the third adjoining-pixel-position, and (c) adding, to the luminance signal interpolated at the pixel position of each first position, a difference between (c-1) the third color signal existing at the third adjoining-pixel-position and (c-2) the luminance signal interpolated at the third adjoining-pixel-position.

[4] According to the signal processing apparatus of [2], the synchronization processing unit interpolates, using a luminance-no-use-estimating processing, (i) a third color signal to be interpolated at the pixel position where each second color signal exists and (ii) a second color signal to be interpolated at the pixel position where each third color signal exists, and the luminance no-use-estimating processing is a processing that estimates: (i) the third color signal to be interpolated at the pixel position of each second color signal, by using the same kind of color signal as the third color signal to be interpolated (a) existing in the vicinity of each second color signal and (b) included in the second line including a color signal existing at the pixel position of each second color signal; and (ii) the second color signal to be interpolated at the pixel position of each third color signal, by using the same kind of color signal as the second color signal to be interpolated (a) existing in the vicinity of each third color signal and (b) included in the second line including a color signal existing at the pixel position of each third color signal.

[5] According to the signal processing apparatus according of [2], the color signal interpolating processing to be carried out by the synchronization processing unit includes a firstcolor-signal-use-estimating processing that estimates the color signal to be interpolated at each pixel position by using (i) the same kind of color signal as the color signal to be interpolated existing around each pixel position (ii) the first color signal existing around each pixel position.

[6] According to the signal processing apparatus of [5], the image pickup signal disposed at the respective coordinate positions are structured such that, when viewed in a crossing direction crossing the given direction and the perpendicular direction, third lines including some of the first color signals and the second color signals arranged in the crossing direction and fourth lines including the other of the first color signals and the third color signals arranged in the crossing direction are alternately arranged in a perpendicular direction perpendicular to the crossing direction with fifth lines including the luminance signals arranged in the crossing direction between the third and fourth lines. The synchronization processing unit, interpolates, using the first-color-signal-use-estimating processing, as to each pixel position where the color signal having a correlation in the crossing direction exists, (i) a third color signal to be interpolated at the pixel position of each second color signal, (ii) a second color signal to be interpolated at the pixel position of each third color signal, (iii) a third color signal to be interpolated at the pixel position of each first color signal included in each third line, and (iv) a second color signal to be interpolated at a pixel position of each first color signal included in each fourth line. The first-color-signal-use-estimating processing is a processing that estimates: (i) the second color signal to be interpolated at the pixel position of each third color signal, using (a) the first color signal (a-1) existing in the vicinity of the pixel position of each third color signal and (a-2) included in the fourth line including a color signal existing at the pixel position of each third color signal, (b) the first color signal (b-1) existing in the vicinity of the pixel position of each third color signal and (b-2) included in the third line adjoining the fourth line, and (c) the second color signal existing in the vicinity of the first color signal included in the third line; (ii) the third color signal to be interpolated at the pixel position of each second color signal, using (a) the first color signal (a-1) existing in the vicinity of the pixel position of each second color signal and (a-2) included in the third line including a color signal existing at the pixel position of each second color signal, (b) the first color signal (b-1) existing in the vicinity of the pixel position of each second color signal and (b-2) included in the fourth line adjoining the third line, and (c) the third color signal existing in the vicinity of the first color signal included in the fourth line; (iii) the third color signal to be interpolated at the pixel position of each first color signal included in the third line, using (a) each first color signal, (b) the third color signal (b-1) existing in the vicinity of the pixel position of each first color signal and (b-2) included in the fourth line adjoining the third line including each first color signal, and (c) the first color signal existing in the vicinity of the third color signal included in the fourth line; and (iv) the second color signal to be interpolated at the pixel position of each first color signal included in the fourth line, using (a) each first color signal, (b) the second color signal (b-1) existing in the vicinity of the pixel position of each first color signal and (b-2) included in the third line adjoining the fourth line, and (c) the first signal existing in the vicinity of the second color signal included in the fourth line.

[7] According to the signal processing apparatus of [6], the synchronization processing unit interpolates using a first-color-signal-no-use-estimating processing, (i) a first color signals respectively to be interpolated at the pixel position of each second color signal and the pixel position of each third color signal, (ii) a second color signal to be interpolated at the pixel position of each first color signal included in the third line, and (iii) a third color signal to be interpolated at a position of each first color signal included in the fourth line. The first-color-signal-no-use-estimating processing is a processing that estimates. (i) the first color signal to be interpolated at the pixel position of each second color signal, using the first color signal existing in the vicinity of each second color signal included in the third line including each second color signal; (ii) the first color signal to be interpolated at the pixel position of each third color signal, using the first color signal existing in the vicinity of the third color signal included in the fourth line including each third color signal; (iii) the second color signal to be interpolated at the pixel position of each first color signal included in the third line, using the second color signal existing in the vicinity of each first color signal included in the third line; and (iv) the third color signal to be interpolated at the pixel position of each first color signal included in the fourth line, using the third color signal existing in the vicinity of the first color signal included in the fourth line.

[8] According to the signal processing apparatus according of [2], the first color signal is a green color signal, the second color signal is a red color signal, and the third color signal is a blue color signal.

[9] According to the signal processing apparatus of [2], the image pickup device includes: a first group containing color detecting photoelectric conversion elements for detecting light color components respectively corresponding to the respective first, second and third color signals; and a second group containing luminance detecting photoelectric conversion elements for detecting light luminance components respectively corresponding to the luminance signals; and the photoelectric conversion elements included in the first group, when the positions of the respective photoelectric conversion elements included in the second group are regarded as the reference position, are disposed shifted in a shifted direction from the reference position in such a manner that one of the photoelectric conversion elements included in the first group can adjoin the photoelectric conversion elements included in the second group.

[10] According to the signal processing apparatus according of [1], the synchronization processing unit (1) adds the same kind of signals together adjoining in (i) a given direction, (ii) a perpendicular direction perpendicular to the given direction or (iii) the given direction and the perpendicular direction for decreasing the numbers of three kinds of color signals and (2) disposes the image pickup signal at respective coordinate positions.

[11] According to the signal processing apparatus of [1], the image pickup device includes a plurality of photoelectric conversion elements for detecting the color signals, the three kinds of color signals are obtained by a driving processing that (1) adds charges (a) obtained from the photoelectric conversion elements and (b) having the same color components together adjoining in (i) a given direction, (ii) a perpendicular direction perpendicular to the given direction or (iii) the given direction and the perpendicular direction for decreasing the numbers of charges, and (2) outputs color signals according to the added charges.

[12] According to the signal processing apparatus of [10], the three kinds of color signals are green color signals, red color signals, and blue color signals. And the synchronization processing unit adds as to red color signals and blue color signals.

[13] According to the signal processing apparatus of [11], the three kinds of color signals are green color signals, red color signals, and blue color signals. The red color signals and blue color signals are obtained through the adding.

[14] According to the signal processing apparatus of [1], a image pickup apparatus includes the image pickup elements; and the signal processing apparatus of [1].

[15] According to another aspect of the invention, a computer readable medium storing a program causing a computer to execute a process for processing image pickup signal and generating a color image data, the image pickup signal output from an image pickup device and including three kinds of color signals and luminance signals, the process comprising: disposing signals included in the image pickup signal at respective coordinate positions, and carrying out a interpolating processing that interpolates to the three kinds of color signals at a pixel position which indicates each coordinate position corresponding to a pixel of the color image data to be generated.

According to [1] to [15], it is possible to provide a signal processing apparatus which can enforce a color signal interpolating processing (a synchronizing processing) for reduction of a false color and noise on any color.

DETAILED DESCRIPTION

Now, description will be given below of an embodiment according to the invention with reference to the accompanying drawings.

Figure 1:
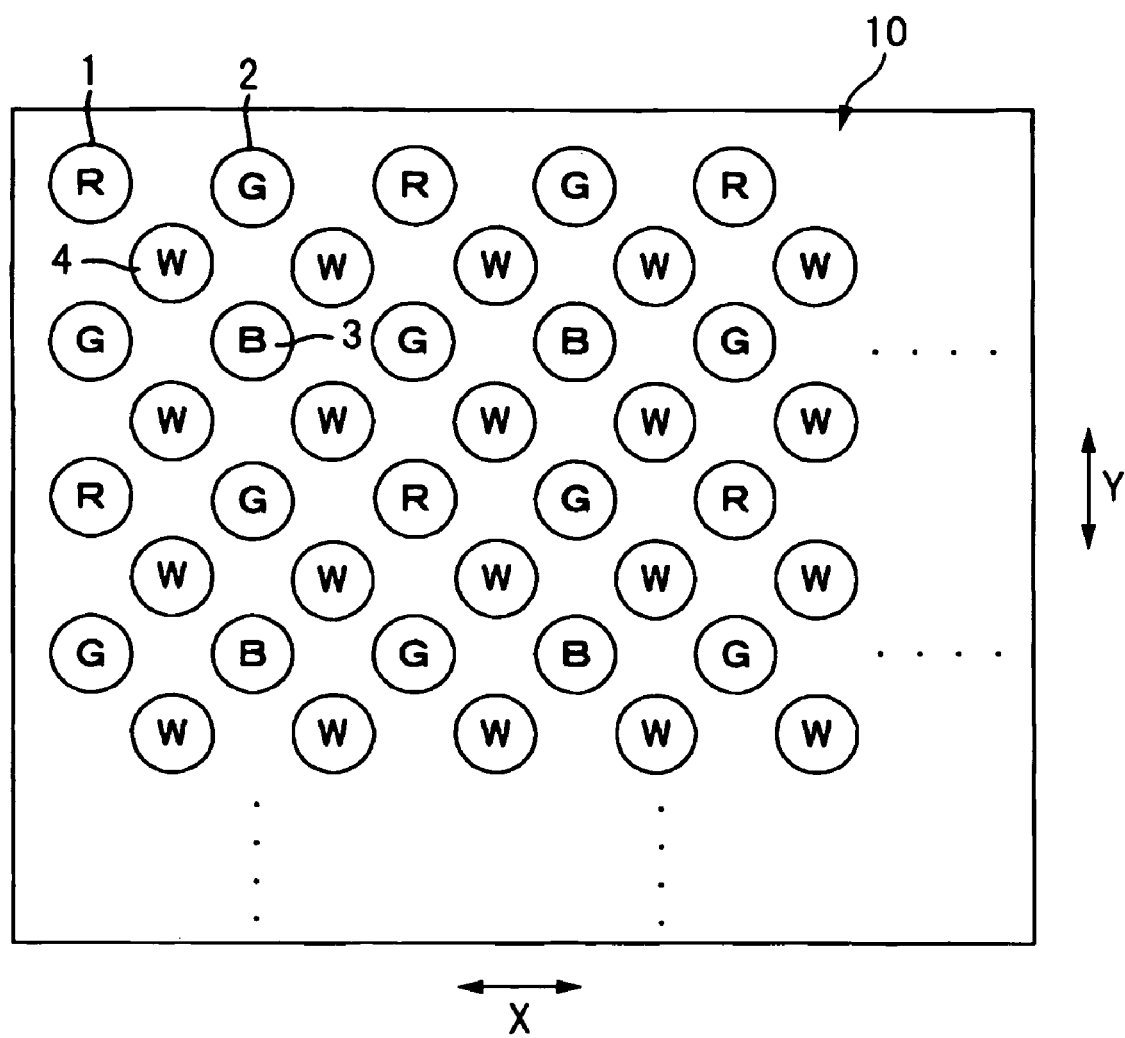
FIG. 1 is a schematic typical plan view of an image pickup element to be incorporated into an image pickup apparatus according to an embodiment of the invention.

FIG. 1 is a schematic typical plan view of an image pickup device to be incorporated into an image pickup apparatus according to an embodiment of the invention.

The image pickup device 10 shown in FIG. 1 includes a first group having a large number of photoelectric conversion elements (1, 2, 3) arranged in the form of a tetragonal lattice on a semiconductor substrate in a row direction X and in a line direction Y perpendicular to the row direction X, and a second group having a large number of photoelectric conversion elements (4) arranged in the form of a tetragonal lattice on the semiconductor substrate in the row direction X and in the line direction Y. The number of photoelectric conversion elements constituting the first group is equal to the number of photoelectric conversion elements constituting the second group.

The photoelectric conversion elements included in the first group, when the positions of the photoelectric conversion elements included in the second group are regarded as reference positions, are disposed at positions shifted in a given direction (in the embodiment shown in FIG. 1, in a direction which slants left upwardly at 45 degrees) from the reference positions so that one photoelectric conversion element included in the first group is allowed to adjoin the respective photoelectric conversion elements 4 included in the second group; and, all photoelectric conversion elements are arranged in a so called honeycomb manner. That is, the large number of photoelectric conversion elements included in the image pickup device 10 are disposed in such a manner that a plurality of photoelectric conversion element lines, each of which includes a plurality of photoelectric conversion elements arranged at a given pitch in the Y direction, are arranged at a given pitch in the X direction. And, the two mutually adjoining photoelectric conversion element lines have such a structure as disclosed in the Japanese Patent Publication Hei-10-136391 in which the two lines are disposed shifted from each other in the Y direction about ½ of the Y-direction arrangement pitch of the photoelectric conversion elements included in the two photoelectric conversion element lines.

The photoelectric conversion elements 1 to 4 are the same in structure with each other and, depending on filters which are formed upwardly of their respective light receiving surfaces, the light components to be detected by them are different from each other.

The photoelectric conversion element 1 includes on the light receiving surface thereof an R color filter which transmits the red color (R) component of the light and, owing to this, it functions as a photoelectric conversion element for detecting the R component of the light. The photoelectric conversion element 2 includes on the light receiving surface thereof a G color filter which transmits the green color (G) component of the light and, owing to this, it functions as a photoelectric conversion element for detecting the G component of the light. The photoelectric conversion element 3 includes on the light receiving surface thereof a B color filter which transmits the blue color (B) component of the light and, owing to this, it functions as a photoelectric conversion element for detecting the B component of the light. The photoelectric conversion element 4 includes on the light receiving surface thereof a luminance filter having a spectral characteristic correlated with the luminance component of the light and, owing to this, it functions as a photoelectric conversion element for detecting the luminance component of the light.

The luminance filter includes an ND filter, a transparent filter, a white color filter, a grey color filter and the like; and, employment of a structure, in which nothing is provided upwardly of the light receiving surface of the photoelectric conversion element 4 but the light is allowed to enter the light receiving surface directly, can also be said that there is provided a luminance filter.

A color filter, which is provided upwardly of the light receiving surface of each of the photoelectric conversion elements belonging to the first group, has a Bayer arrangement. That is, the photoelectric conversion elements of the first group are disposed in such a manner that an RG photoelectric conversion element row and a GB photoelectric conversion element row are arranged alternately in the Y direction. Here, in the RG photoelectric conversion element row, the photoelectric conversion element 1 and photoelectric conversion element 2 are arranged alternately in this order in the X direction; and, in the GB photoelectric conversion element row, the photoelectric conversion element 2 and photoelectric conversion element 3 are arranged alternately in this order in the X direction.

In the following description, an image pickup signal for expressing a red color component to be obtained from the photoelectric conversion element 1 is referred to as an R signal; an image pickup signal for expressing a green color component to be obtained from the photoelectric conversion element 2 is referred to as a G signal; an image pickup signal for expressing a blue color component to be obtained from the photoelectric conversion element 3 is referred to as a B signal;

and, an image pickup signal for expressing a luminance component to be obtained from the photoelectric conversion element 4 is referred to as a W signal.

Figure 2:
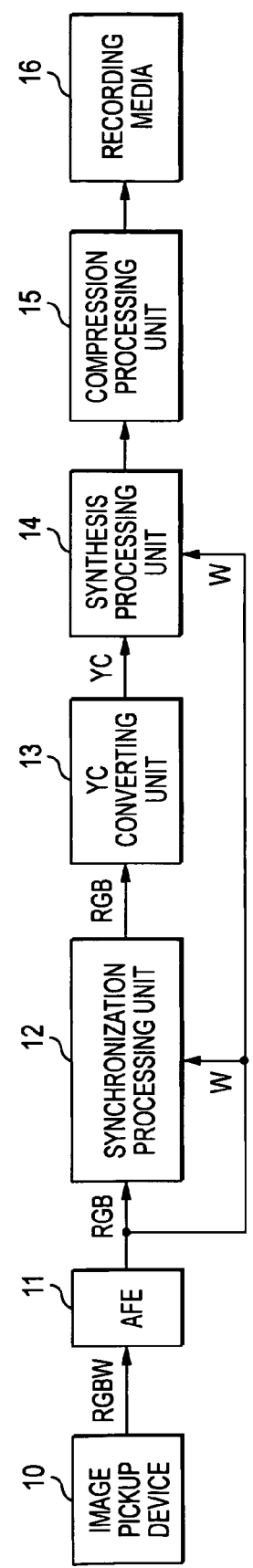
FIG. 2 is a block diagram of a general structure of the image pickup apparatus according to the embodiment of the invention.

FIG. 2 is a block diagram of a schematic structure of the image pickup apparatus according to the embodiment of the invention.

The image pickup apparatus shown in FIG. 2 includes the image pickup device 10 shown in FIG. 1, an AFE 11 for enforcing a given analog signal processing and a digital conversion processing on an analog signal to be output from the image pickup device 10, a synchronizing processing unit 12 used to enforce a synchronizing processing for providing three color signals, that is, R, G and B color signals at pixel positions which indicate respective coordinate positions of pixel data constituting color image data to be generated, a YC conversion unit 13 for converting the three color signals, that is, R, G and B color signals provided at one position by the synchronizing processing to a luminance signal Y and a color difference signal C, a synthesis processing unit 14 for synthesizing together the Y and C signals and the image pickup signal obtained from the photoelectric conversion element 4, a compression processing unit 15, and a recording media 16.

The synchronization processing unit 12 carries out a synchronizing processing which, from the image pickup signal to be output from the AFE11, interpolatingly generates color signals, which cannot be obtained from the photoelectric conversion elements 1 to 3 in a memory, at the coordinate positions (which are pixel positions of pixel data constituting color image data to be generated) corresponding to the respective photoelectric conversion elements 1 to 3 by using color signals obtained from photoelectric conversion elements existing in the peripheries of the photoelectric conversion elements 1 to 3. The synchronization processing unit 12 is a function which can be realized when a DSP or the like carries out a given program. Now, description will be given below of a specific method which is employed by the synchronization processing unit 12.

Figure 3:
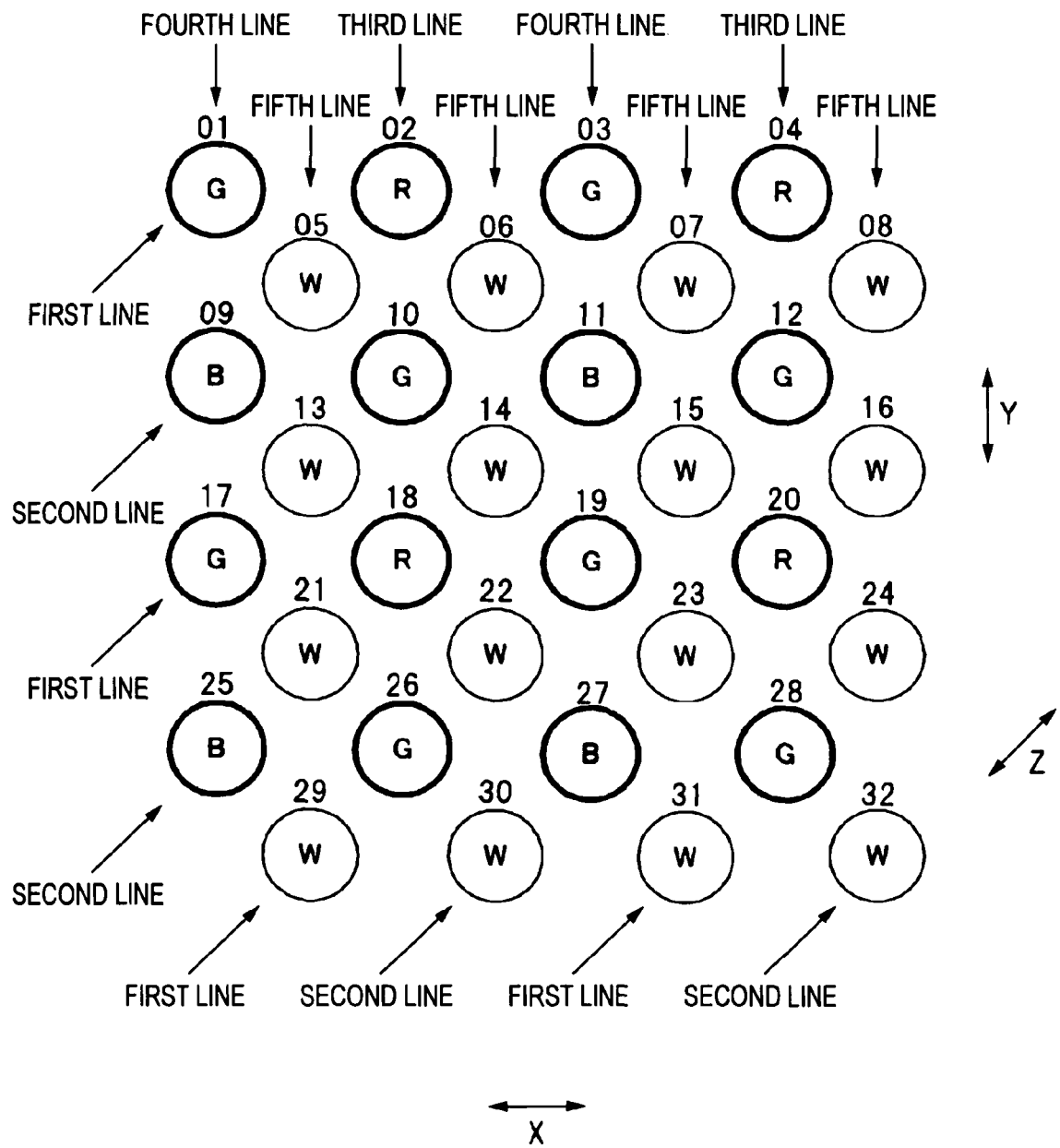
FIG. 3 is a view of the arrangement of image pickup signals output from AFE shown in FIG. 2 and disposed in a memory.

FIG. 3 is a view of the arrangements of image pickup signals arranged in the memory. In FIG. 3, circles, in each of which "R" is stated, respectively express the R signals that are obtained from the photoelectric conversion element 1; circles, in each of which "G" is stated, respectively express the G signals that are obtained from the photoelectric conversion element 2; circles, in each of which "B" is stated, respectively express the B signals that are obtained from the photoelectric conversion element 3; and, circles, in each of which "W" is stated, respectively express the W signals that are obtained from the photoelectric conversion element 4. The positions, where these signals exist, respectively correspond to the positions of the photoelectric conversion elements from which these signals are output; and, these positions are defined as pixel positions. Above the pixel positions, there are given the numbers (01 to 32) that express the pixel positions. For example, the G signal may correspond to a first color signal, the R signal may correspond to a second color signal, and the B signal may correspond to a third color signal.

As shown in FIG. 3, the image pickup signals arranged in the memory, when they are viewed from a Z direction which crosses the X direction and Y direction at 45 degrees, are structured such that a first line including the W signals and G signals alternately arranged in the Z direction and a second line including the R signals and B signals alternately arranged with the W signals between them in the Z direction are arranged alternately in a direction perpendicular to the Z direction. Also, when viewed in the Y direction, a third line including the G signals and R signals alternately arranged in the Y direction and a fourth line including the G signals and B signals alternately arranged in the Y direction are arranged in the X direction with a fifth line including the W signals arranged in the Y direction between them. The Z direction may correspond to a given direction, while the Y direction may correspond to a crossing direction.

The synchronization processing unit 12 checks in which direction a large number of image pickup signals output from the AFE 11 have a correlation between them by using, for example, the W signals that adjoin their respective image signals. And, for the image pickup signals having a correlation in the Z direction or in a direction perpendicular to the Z direction, at pixel positions where the R signals, G signals and B signals exist respectively, there are interpolated the color signals that do not exist at such pixel positions, using a luminance-use-estimating processing and a luminance-no-use-estimating processing. Here, the luminance-use-estimating processing is a processing which estimates color signals to be interpolated at pixel positions where such image pickup signals exist, using (i) the same kinds of color signals as the color signals to be interpolated existing in the peripheries of such pixel positions and (ii) W signals existing in peripheries of such pixel positions; and, the luminance-no-use-estimating processing is a processing which estimates color signals to be interpolated at such pixel positions, using the same kinds of color signals as the color signals to be interpolated existing in the peripheries of such pixel positions.

Also, for image pickup signals which have a correlation between them in the X direction or in the Y direction, the synchronization processing unit 12 interpolates, at pixel positions where the R signals, G signals and B signals exist respectively, color signals which do not exist at such pixel positions, by using a G-use-estimating processing and a G-no-use-estimating processing. Here, the G-use-estimating processing is a processing in which colors to be interpolated at pixel positions where the image pickup signals exist are estimated by using (i) color signals which exist in the peripheries of the above-mentioned pixel positions and are of the same kinds as those of the color signals to be interpolated and (ii) G signals which exist in the peripheries of the above-mentioned pixel positions; and, the G-no-use-estimating processing is a processing in which color signals to be interpolated at the above pixel positions are estimated using color signals which exist in the peripheries of the pixel positions and are of the same kinds of color signals as those of the color signals to be interpolated.

For example, when checking the direction of the correlation of G10 shown in FIG. 3, the synchronization processing unit 12 calculates the following four directions, that is, the Y direction: (W05+W13)/2−(W26+W14)/2, X direction: (W05+W06)/2−(W13+W14)/2, Z direction: (W06−W13), and a direction perpendicular to the Z direction: (W05−W14). And, the synchronization processing unit 12 determines that a direction, where the absolute value of the calculation results is smallest, is a direction having a correlation with G10.

In the following description, for convenience of explanation, an R signal existing at a pixel position  is referred to as an "R ", a G signal existing at a pixel position  is referred to as a "G ", a B signal existing at a pixel position  is referred to as a "B ", and a W signal existing at a pixel position  is referred to as a "W".

Now, description will be given specifically of a method (a method 1) for interpolating a color signal at a pixel position at which there exists an image pickup signal having a correlation, for example, in the Z direction, and a method (a method 2) for interpolating a color signal at a pixel position at which there exists an image pickup signal having a correlation, for example, in the Y direction.

(Method 1)

(a) [When Interpolating an R Signal at a Pixel Position where a B Signal Exists]

In this case, the synchronization processing unit 12 estimates an R signal to be interpolated using a luminance-no-use-estimating processing. That is, the synchronization processing unit 12 estimates an R signal to be interpolated at a pixel position where a B signal exists, using an R signal existing in the vicinity of such pixel position and included in a second line including a B signal existing at such pixel position.

For example, when interpolating an R signal (R11) at a pixel position 11, the synchronization processing unit 12 estimates R11 according to the following expression (1) for obtaining the average of R signals (R04, R18) existing in the vicinity of B11 and included in a second line including B11.

$$R11=(R04+R18)/2 \qquad (1)$$

(b) [When Interpolating a B Signal at a Pixel Position where an R Signal Exists]

In this case, the synchronization processing unit 12 estimates a B signal to be interpolated using a luminance-no-use-estimating processing. That is, the synchronization processing unit 12 estimates a B signal to be interpolated at a pixel position where an R signal exists, using a B signal existing in the vicinity of such pixel position and included in a second line including an R signal existing at such pixel position.

For example, when interpolating a B signal (B18) at a pixel position 18, the synchronization processing unit 12 estimates B18 according to the following expression (2) for obtaining the average of B signals (B11, B25) existing in the vicinity of R18 and included in a second line including R18.

$$B18=(B11+B25)/2 \qquad (2)$$

(c) [When Interpolating & Signals Respectively at a Pixel Position where a B Signal Exists and at a Pixel Position where an R Signal Exists]

In this case, the synchronization processing unit 12 estimates G signals to be interpolated using a luminance-use-estimating processing. That is, the synchronization processing unit 12 estimates G signals to be interpolated at a pixel position where a B signal exists and at a pixel position where an R signal exists respectively, using a W signal existing in the vicinity of such pixel position and included in a second line including a color signal existing at such pixel position, a W signal existing in the vicinity of such pixel position and included in a first line adjoining such second line, and a G signal existing in the vicinity of such W signal included in such first line.

For example, when interpolating a G signal (G11) at a pixel position 11, on the premise that, in an object having a correlation in the Z direction, differences between W signals and G signals in the local area of an image are equal, that is, on the premise that the following relationship holds, that is, G11−W11={(G06−W06)+(G15−W15)}/2, the synchronization processing unit 12 estimates G11 according to the following operation (3), that is, $$G11=W11+\{(G06-W06)+(G15-W15)\}/2 \qquad (3).$$

Specifically, the synchronization processing unit 12 firstly interpolates a luminance signal (W11) at a pixel position 11 using luminance signals (W07, W14) existing in the vicinity of the pixel position 11 and included in a second line including B11 existing at the pixel position 11; interpolates G06 at a pixel position 06 adjoining the pixel position 11 in a direction perpendicular to the Z direction, using G signals (G03, G10) respectively existing in the vicinity of the pixel position 06 and included in a first line including W06 existing at the pixel position 06; and, interpolates G15 at a pixel position 15 adjoining the pixel position 11 in the direction perpendicular to the Z direction, using G signals (G12, G19) respectively existing in the vicinity of a pixel position 15 and included in a first line including W15 existing at the pixel position 15.

W11 can be found by computing the average of, for example, W07 and W14; G06 can be found by computing the average of for example, G03 and G10; and, G15 can be found by computing the average of, for example, G12 and G19. After W11, G06 and G15 are found, according the expression (3), there is carried out the operation, W11+{(G06−W06)+(G15−W15)}/2, thereby estimating G11. According to a similar method, a G signal can be interpolated at a pixel position where an R signal exists.

By the way, although the expression (3) is used to estimate G11 based on a correlation between the pixel position 11 and pixel positions 06, 15, alternatively, G11 can also be estimated based on a correlation between the pixel positions 11 and 06 or a correlation between the pixel positions 11 and 15. In this case, the above expression (3) may be used by transforming it into the following expression (4) or (5). That is, $$G11=W11+(G06-W06) \qquad (4),$$

$$G11=W11+(G15-W15) \qquad (5).$$

(d) [When Interpolating R and B Signals at a Pixel Position where a G Signal Exists]

In this case, the synchronization processing unit 12 estimates R and B signals to be interpolated using a luminance-use-estimating processing. That is, an R signal, which is to be interpolated at a pixel position where a G signal exists, can be estimated using a W signal existing in the vicinity of such pixel position and included in a first line including a G signal existing at such pixel position, an R signal existing in the vicinity of such pixel position and included in a second line adjoining the first line, and a W signal existing in the vicinity of such R signal included in the second line. Also, a B signal, which is to be interpolated at a position where a G signal exists, can be estimated using a W signal existing in the vicinity of such pixel position and included in a first line including a G signal existing at such pixel position, a B signal existing in the vicinity of such pixel position and included in a second line adjoining the first line, and a W signal existing in the vicinity of such B signal included in the second line.

For example, when interpolating an R signal (R19) at a pixel position 19, on the premise that differences between W and R signals in the local area of an image are equal, that is, on the premise that the following relationship holds, that is, R19−W19={(R18−W18)+(R20−W20)}/2, R19 can be estimated by carrying out the operation, $$R19=W19+\{(R18-W18)+(R20-W20)\}/2 \qquad (6).$$

Similarly, on the premise that the following relationship holds, that is, B19−W19={(B11−W11)+(B27−W27)}/2, B19 can be estimated by carrying out the following operation, $$B19=W19+\{(B11-W11)+(B27-W27)\} \qquad (7).$$

Specifically, the synchronization processing unit 12 interpolates luminance signal (W19) at a pixel position 19 using the luminous signals (W15, W22) respectively existing in the vicinity of the pixel position 19 and included in a first line including G19 existing at the pixel position 19; interpolates W18 at a pixel position 18, which is a pixel position adjoining the pixel position 19 in the X direction, using W signals (W14, W21) existing in the vicinity of the pixel position 18 and included in a second line including R18 existing at the pixel position 18; and, interpolates W20 at a pixel position 20, which is a pixel position adjoining the pixel position 19 in the X direction, using W signals (W16, W23) existing in the vicinity of the pixel position 20 and included in a second line including R20 existing at the pixel position 20.

Also, the synchronization processing unit 12 interpolates W11 at a pixel position 11, which is a pixel position adjoining the pixel position 19 in the Y direction, using W signals (W07, W14) existing in the vicinity of the pixel position 11 and included in a second line including B11 existing at the pixel position 11; and, interpolates W27 at a pixel position 27, which is a pixel position adjoining the pixel position 19 in the Y direction, using W signals (W23, W30) existing in the vicinity of the pixel position 27 and included in a second line including B27 existing at the pixel position 27.

W19 can be obtained by computing the average of, for example, W15 and W22; W18 can be obtained by computing the average of, for example, W14 and W21; W11 can be obtained by computing the average of, for example, W07 and W14; and, W27 can be obtained by computing the average of, for example, W23 and W30. After W11, W18, W19, W20 and W27 are obtained, R19 can be estimated by carrying out the following operation, that is, W19+{(R18−W18)+(R20−W20)}/2, according to the expression (6); and, B19 can be estimated by carrying out the operation, W19+{(B11−W11)+(B27−W27)}/2, according to the expression (7).

By the way, although the expression (6) is used to estimate R19 based on a correlation between the pixel position 19 and pixel positions 18, 20, R19 can also be estimated based on a correlation between the pixel positions 19 and 18 or based on a correlation between the pixel positions 19 and 20. In this case, the expression (6) may be transformed to the following expression (8) or (9) before it is used for such estimation. That is, $$R19=W19+(R18-W18) \tag{8); and,}$$

$$R19=W19+(R20-W20) \tag{9}$$

Also, although the expression (7) is used to estimate B19 based on a correlation between the pixel position 19 and pixel positions 11, 27, B19 can also be estimated based on a correlation between the pixel positions 19 and 11 or based on a correlation between the pixel positions 19 and 27. In this case, the expression (7) may be transformed to the following expression (10) or (11) before it is used for such estimation. That is, $$B19=W19+(B11-W11) \tag{10); and,}$$

$$B19=W19+(B27-W27) \tag{11}$$

Execution of the above-mentioned processings (a) to (d) can create a state in which R, G and B signals respectively exist at the respective pixel positions.

(Method 2)

(a) [When Interpolating a & Signal at a Pixel Position where a B Signal Exists]

In this case, the synchronization processing unit 12 estimates a G signal to be interpolated according to a G-no-use-estimating processing. That is, the synchronization processing unit 12 estimates a G signal to be interpolated at a pixel position where a B signal exists using a G signal which exists in the vicinity of such B signal and is included in a fourth line including such B signal.

For example, when interpolating a G signal (G11) at a pixel position 11, the synchronization processing unit 12 estimates G11 according to the following expression (12) for obtaining the average of G signals (G03, G19) existing in the vicinity of B11 and included in a fourth line including G11. That is, $$G11=(G03+G19)/2 \tag{12}$$

(b) [When Interpolating a G Signal at a Pixel Position where an R Signal Exists]

In this case, the synchronization processing unit 12 estimates a G signal to be interpolated according to a G-no-use-estimating processing. That is, the synchronization processing unit 12 estimates a G signal to be interpolated at a pixel position where an R signal exists, using a G signal existing in the vicinity of such R signal and included in a third line including such R signal.

For example, when interpolating a G signal (G18) at a pixel position 18, the synchronization processing unit 12 estimates G18 according to the following expression (13) for obtaining the average of G signals (G10, G26) existing in the vicinity of R18 and included in a third line including R18. That is, $$G18=(G10+G26)/2 \tag{13}$$

(c) [When Interpolating an R Signal at a Pixel Position where a B Signal Exists]

In this case, the synchronization processing unit 12 estimates an R signal to be interpolated according to a G-use-estimating processing. That is, the synchronization processing unit 12 estimates an R signal to be interpolated at a pixel position where a B signal exists, using a G signal existing in the vicinity of such pixel position and included in a fourth line including a color signal existing at such pixel position, a G signal existing in the vicinity of such position and included in a third line adjoining such fourth line, and an R signal existing in the vicinity of such G signal included in such third line.

For example, when interpolating an R signal (R11) at a pixel position 11, on the premise that, in an object having a correlation in the Y direction, differences between R and G signals in the local area of an image are equal to each other, that is, on the premise that the following relationship holds, R11−G11={(R10−G10)+(R12−G12)}/2, the synchronization processing unit 12 estimates R11 by carrying out the operation of $$R11=G11+\{(R10-G10)+(R12-G12)\}/2 \tag{14}$$

Specifically, the synchronization processing unit 12 firstly interpolates a G signal (G11) at a pixel position 11 using G signals (G03, G19) existing in the vicinity of the pixel position 11 and included in a fourth line including B11 existing at the pixel position; interpolates R10 at a pixel position 10, which is a pixel position adjoins the pixel position 11 in the X direction, using R signals (R02, R18) respectively existing in the vicinity of the pixel position 10 and included in a third line including G10 existing at the pixel position 10; and, interpolates R12 at a pixel position 12, which is a pixel position adjoins the pixel position 11 in the X direction, using R signals (R04, R20) respectively existing in the vicinity of the pixel position 12 and included in a third line including G12 existing at the pixel position 12.

G11 can be obtained by computing the average of, for example, G03 and G19; R10 can be obtained by computing the average of, for example, R02 and R18; and, R12 can be obtained by computing the average of, for example, R04 and R20. After G11, R10 and R12 are obtained, the synchronization processing unit 12 estimates R11 by carrying out the operation of G11+{(R10−G10)+(R12−G12)}/2 according to the expression (14).

By the way, although the expression (14) is used to estimate R11 based on a correlation between the pixel position 11 and pixel positions 10 and 12, R11 can also be estimated based on a correlation between the pixel positions 11 and 10 or a correlation between the pixel positions 11 and 12. In this case, the expression (14) may be transformed to the following expression (15) or (16) before it is applied actually. That is, $$R11=G11+(R10-G10) \quad (15); \text{ and,}$$

$$R11=G11+(R12-G12) \quad (16).$$

(d) [When Interpolating a B Signal at a Pixel Position where an R Signal Exists]

In this case, the synchronization processing unit 12 estimates a B signal to be interpolated according to a G use estimating processing. That is, the synchronization processing unit 12 estimates a B signal to be interpolated at a pixel position where an R signal exists, using a G signal existing in the vicinity of such pixel position and included in a third line including a color signal existing at such pixel position, a G signal existing in the vicinity of such pixel position and included in a fourth line adjoining such third line, and a B signal existing in the vicinity of such G signal included in such fourth line.

For example, when interpolating a B signal (B18) at a pixel position 18, on the premise that, in an object having a correlation in the Y direction, differences between B and G signals in the local area of an image are equal to each other, that is, on the premise that the following relationship holds, B18−G18={(B17−G17)+(B19−G19)}/2, the synchronization processing unit 12 estimates B18 by carrying out the operation of $$R18=G18+\{(B17-G17)+(B19-G19)\}/2 \quad (17).$$

Specifically, the synchronization processing unit 12 firstly interpolates a G signal (G18) at a pixel position 18 using G signals (G10, G26) respectively existing in the vicinity of the pixel position 18 and included in a third line including R18 existing at the pixel position 18; then, interpolates B17 at a pixel position 17 which is a pixel position adjoining the pixel position 18 in the X direction, using B signals (B09, B25) respectively existing in the vicinity of the pixel position 17 and included in a fourth line including G17 existing at the pixel position 17; and, interpolates B19 at a pixel position 19 which is a pixel position adjoining the pixel position 18 in the X direction, using B signals (B11, B27) respectively existing in the vicinity of the pixel position 19 and included in a fourth line including G19 existing at the pixel position 19.

Here, G18 can be obtained by computing the average of, for example, G10 and G26; B17 can be obtained by computing the average of, for example, B09 and B25; and, B19 can be obtained by computing the average of, for example, B11 and B27. After G18, B17 and B19 are obtained, the synchronization processing unit 12 estimates B18 by carrying out the operation, G18+{(B17−G17)+(B19−G19)}/2, according to the expression (17).

By the way, although the expression (17) is used to estimate B18 based on a correlation between the pixel position 18 and pixel positions 17 and 19, B18 can also be estimated based on a correlation between the pixel position 18 and pixel position 17 or based on a correlation between the pixel position 18 and pixel position 19. In this case, the expression (17) may be transformed to the following expression (18) or (19) before it is applied actually. That is, $$B11=G18+(B17-G17) \quad (18); \text{ or,}$$

$$B18=G18+(B19-G19) \quad (19).$$

(e) [When Interpolating an R Signal at a Pixel Position where a G Signal Included in a Fourth Line Exists]

In this case, the synchronization processing unit 12 estimates an R signal to be interpolated by a G use estimating processing. That is, the synchronization processing unit 12 estimates an R signal to be interpolated at a pixel position where a G signal included in a fourth line exists, using such G signal, an R signal existing in the vicinity of such pixel position and included in a third line adjoining such fourth line, and a G signal existing in the vicinity of such R signal included in such fourth line.

For example, when interpolating an R signal (R19) at a pixel position 19, on the premise that, in an object having a correlation in the Y direction, differences between R and G signals in the local area of an image are equal to each other, that is, on the premise that the following relationship holds, R19−G19={(R18−G18)+(R20−G20)}/2, the synchronization processing unit 12 estimates R19 by carrying out the operation of $$R19=G19+\{(R18-G18)+(R20-G20)\}/2 \quad (20).$$

Specifically, the synchronization processing unit 12 firstly interpolates a G signal (G18) at a pixel position 18 using G signals (G10, G26) respectively existing in the vicinity of the pixel position 18 and included in a third line including R18 existing at the pixel position 18; and, interpolates G20 at a pixel position 20 which is a pixel position adjoining the pixel position 18 in the X direction, using G signals (G12, G28) respectively existing in the vicinity of the pixel position 20 and included in a third line including R20 existing at the pixel position 20.

Here, G18 can be obtained by computing the average of, for example, G10 and G26; and, G20 can be obtained by computing the average of, for example, G12 and G28. After G18 and G20 are obtained, the synchronization processing unit 12 estimates R19 by carrying out the operation, G19+{(R18−G18)+(R20−G20)}/2, according to the expression (20).

By the way, although the expression (20) is used to estimate R19 based on a correlation between the pixel position 19 and pixel positions 18, 20, R19 can also be estimated based on a correlation between the pixel position 19 and pixel position 18 or based on a correlation between the pixel position 19 and pixel position 20. In this case, the expression (20) may be transformed to the following expression (21) or (22) before it is applied actually. That is, $$R19=G19+(R18-G18) \quad (21); \text{ or,}$$

$$R19=G19+(R20-G20) \quad (22).$$

(f) [When Interpolating a B Signal at a Pixel Position where a G Signal Included in a Third Line Exists]

In this case, the synchronization processing unit 12 estimates a B signal to be interpolated by a G-use-estimating processing. That is, the synchronization processing unit 12 estimates a B signal to be interpolated at a pixel position where a G signal included in a third line exists, using such G signal, a B signal existing in the vicinity of such pixel position and included in a fourth line adjoining a third line including such G signal, and a G signal existing in the vicinity of such B signal included in such fourth line.

For example, when interpolating a B signal (B10) at a pixel position 10, on the premise that, in an object having a correlation in the Y direction, differences between B and G signals in the local area of an image are equal to each other, that is, on the premise that the following relationship holds, B10−G10={(B09−G09)+(B11−G11)}/2, the synchronization processing unit 12 estimates B10 by carrying out the operation of $$B10=G10+\{(B09-G09)+(B11-G11)\}/2 \quad (23).$$

Specifically, the synchronization processing unit 12 firstly interpolates G09 at a pixel position 09, which is a pixel position adjoining a pixel position 10 in the X direction, using G signals (G0, G17) respectively existing in the vicinity of the pixel position 09 and included in a fourth line including B09 existing at the pixel position 09; and, interpolates G11 at a pixel position 11 which is a pixel position adjoining the pixel position 10 in the X direction, using G signals (G03, G19) respectively existing in the vicinity of the pixel position 11 and included in a fourth line including B11 existing at the pixel position 11.

Here, G09 can be obtained by computing the average of, for example, G01 and G17; and, G11 can be obtained by computing the average of for example, G03 and G19. After G09 and G11 are obtained, the synchronization processing unit 12 estimates B10 by carrying out the operation, G10+{(B09−G09)+(B11−G01)}/2, according to the expression (23).

By the way, although the expression (23) is used to estimate B10 based on a correlation between the pixel position 10 and pixel positions 09 and 11, B10 can also be estimated based on a correlation between the pixel position 10 and pixel position 09 or based on a correlation between the pixel position 10 and pixel position 11. In this case, the expression (23) may be transformed to the following expression (24) or (25) before it is applied actually. That is, $$B10=G10+(B09-G09) \quad (24); \text{or,}$$

$$B10=G10+(B11-G11) \quad (25).$$

(g) [When Interpolating an R Signal at a Pixel Position where a & Signal Included in a Third Line Exists]

In this case, the synchronization processing unit 12 estimates an R signal to be interpolated by a G-no-use-estimating processing. That is, the synchronization processing unit 12 estimates an R signal, which is to be interpolated at a pixel position where a G signal included in a third line exists, using an R signal existing in the vicinity of such G signal and included in such third line.

For example, when interpolating an R signal (R10) at a pixel position 10, the synchronization processing unit 12 estimates R10 according to the following expression (26) for obtaining the average of R signals (R02, R18) respectively existing in the vicinity of G10 and included in a third line including G10. That is, $$R10=(R02+R18)/2 \quad (26).$$

(h) [When Interpolating a B Signal at a Pixel Position where a G Signal Included in a Fourth Line Exists]

In this case, the synchronization processing unit 12 estimates a B signal to be interpolated by a G-no-use-estimating processing. That is, the synchronization processing unit 12 estimates a B signal, which is to be interpolated at a pixel position where a G signal included in a fourth line exists, using a B signal existing in the vicinity of such G signal and included in such fourth line.

For example, when interpolating a B signal (B17) at a pixel position 17, the synchronization processing unit 12 estimates B17 according to the following expression (27) for obtaining the average of B signals (B09, B25) respectively existing in the vicinity of G17 and included in a fourth line including G17. That is, $$B17=(B09+B25)/2 \quad (27).$$

Execution of the above-mentioned processings (a) to (h) can create a state where R signals, G signals and B signals exist at the respective positions.

The synchronization processing unit 12 carries out the above-mentioned processings included in the methods 1 and 2 according to an object to thereby generate three color signals of R, G and B at pixel positions respectively corresponding to the photoelectric elements 1, 2 and 3. In the YC conversion unit 13, from signals which respectively exist at pixel positions corresponding to the photoelectric conversion elements 1, 2 and 3, there are generated YC signals which correspond to the respective pixel positions. In the synthesis processing unit 14, there is carried out a synthesizing processing in which luminance signals generated at the respective pixel positions and W signals existing at pixel positions adjoining the above existing positions are synthesized. This completes formation of the same number of color image data on resolving power as the photoelectric conversion elements which constitute the first group. By the way, although such synthesizing processing may not be carried out, since the photoelectric conversion element 4 is higher in sensitivity than other photoelectric conversion elements, execution of a synthesizing processing can expand a dynamic range. The color image data after execution of the synthesis processing are compressed by the compression processing unit 15 and are then recorded into the recording media 16.

In this manner, according to the present invention, on an oblique object having a correlation in the Z direction (for example, an image like an arrow extending in the Z direction), there is enforced a synchronizing processing according to the method 1 and, on a vertical object having a correlation in the Y direction (for example, an image like an arrow extending in the Y direction), there is enforced a synchronizing processing according the method 2. Thus, when compared with the technology in which, on the oblique object as well, there is enforced a synchronizing processing according to the method 2, the invention can reduce a false color when picking up the image of an object including an oblique object and thus can realize the enhanced image quality.

Also, since the photoelectric conversion element 4 is wider in the wavelength range of incident lights and is higher in the sensitivity than other photoelectric conversion elements, the S/N of a W signal is better than the S/N of a G signal. When enforcing such luminous-use-estimating processings as shown in the expressions (3) to (11), a signal to be interpolated can be estimated based on the W signal of less noise, which makes it possible to generate an image of less noise.

Also, for example, when a transparent filter or the like is used as a luminance filter, since a W signal contains all contents of an R signal, a G signal and a B signal, correlations between the W signal and the respective R, G and B signals are higher than (i) a correlation between the G and R signals and (ii) a correlation between the G and B signals. In the above-mentioned method 1, not only the G signals to be interpolated respectively at a pixel position where the R signal exists and at a pixel position where the B signal exists, but also the R signals and B signals to be interpolated respectively at pixel positions where the G signals exist can be obtained based on a correlation between the W and G signals or based on a correlation between the W signal and R or B signal. In this manner, since a signal to be interpolated can be estimated using a signal having a high correlation, the false color reducing effect can be enhanced.

Also, the application of the above-described synchronizing processing is not limited to an image pickup apparatus which incorporates therein such an image pickup device 10 as shown in FIG. 1 but such processing can also be applied to, for example, a two plate type of image pickup apparatus which incorporates therein an image pickup element having a first group of photoelectric conversion elements and an image pickup element having a second group of photoelectric conversion elements in such a manner that these image pickup elements are disposed shifted from each other at the sampling points thereof. Also, this synchronizing processing can also be carried by inputting RAW data obtained from the image pickup device 10 into a computer and executing a given program within this computer.

Also, according to the embodiment, as the image pickup device 10, there is used an image sensor; however, a line sensor may also be used. In this case, there may be used an image pickup element structured such that the following two lines are arranged in a direction perpendicular to a given direction: that is, one line in which a photoelectric conversion element for outputting an R signal, a photoelectric conversion element for outputting a G signal, and a photoelectric conversion element for outputting a B signal are arranged in the given direction; and, the other in which photoelectric conversion elements respectively for outputting W signals are arranged in the given direction.

And as described above, after arranging color signals obtained from the photoelectric conversion elements 1 to 3 at pixel positions of pixel data constituting the color image data to be generated, there is enforced a synchronizing processing. As to the color signals obtained from the photoelectric conversion elements 1 to 3, there can be enforced the synchronizing processing after (i) adding the same kind of signals together for decreasing the numbers of the color signals and (ii) arranging added color signals at pixel positions.

Figure 4:
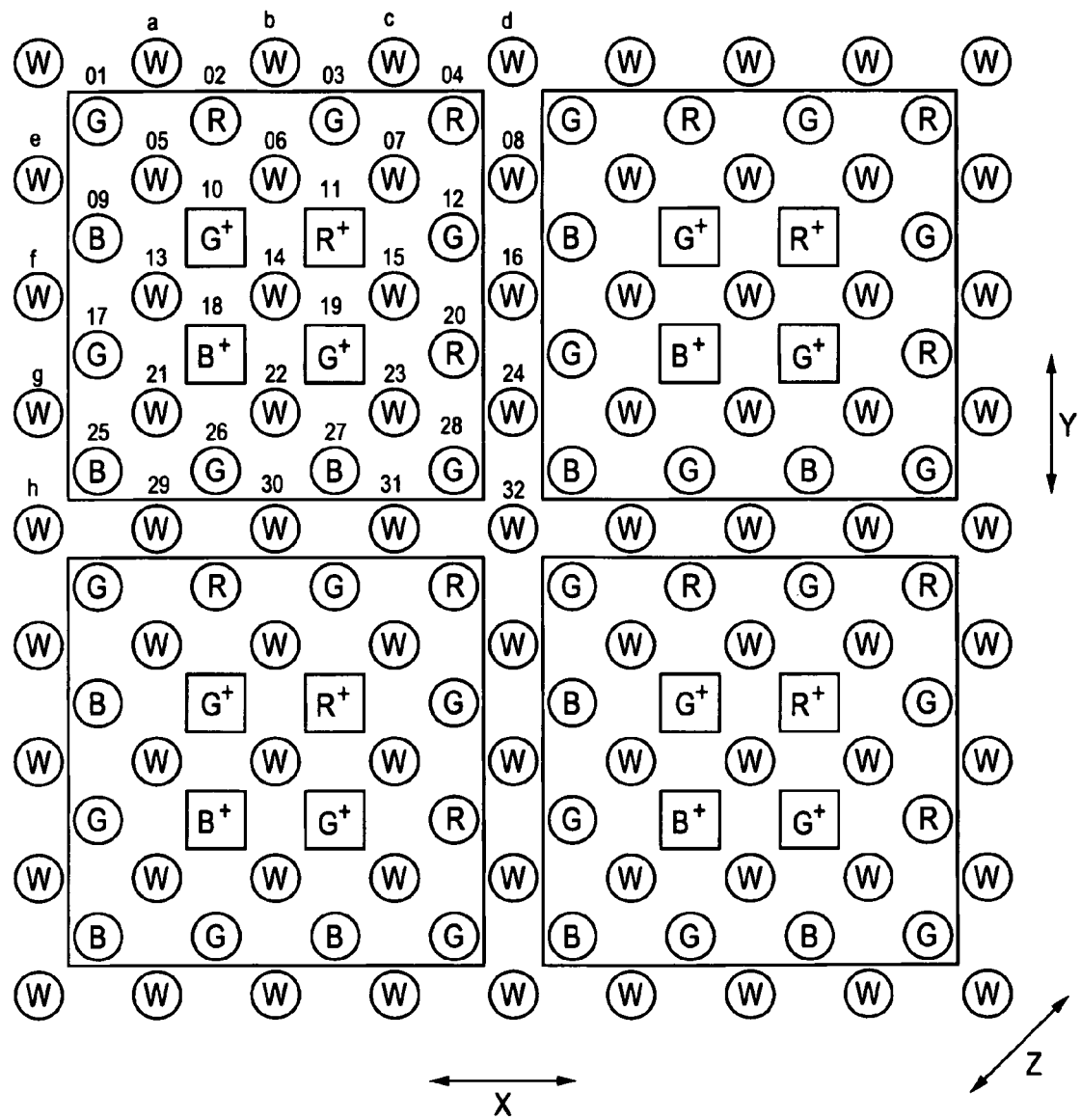
FIG. 4 is an explanatory view of a synchronization processing method in the Patent reference 1.
Figure 5:
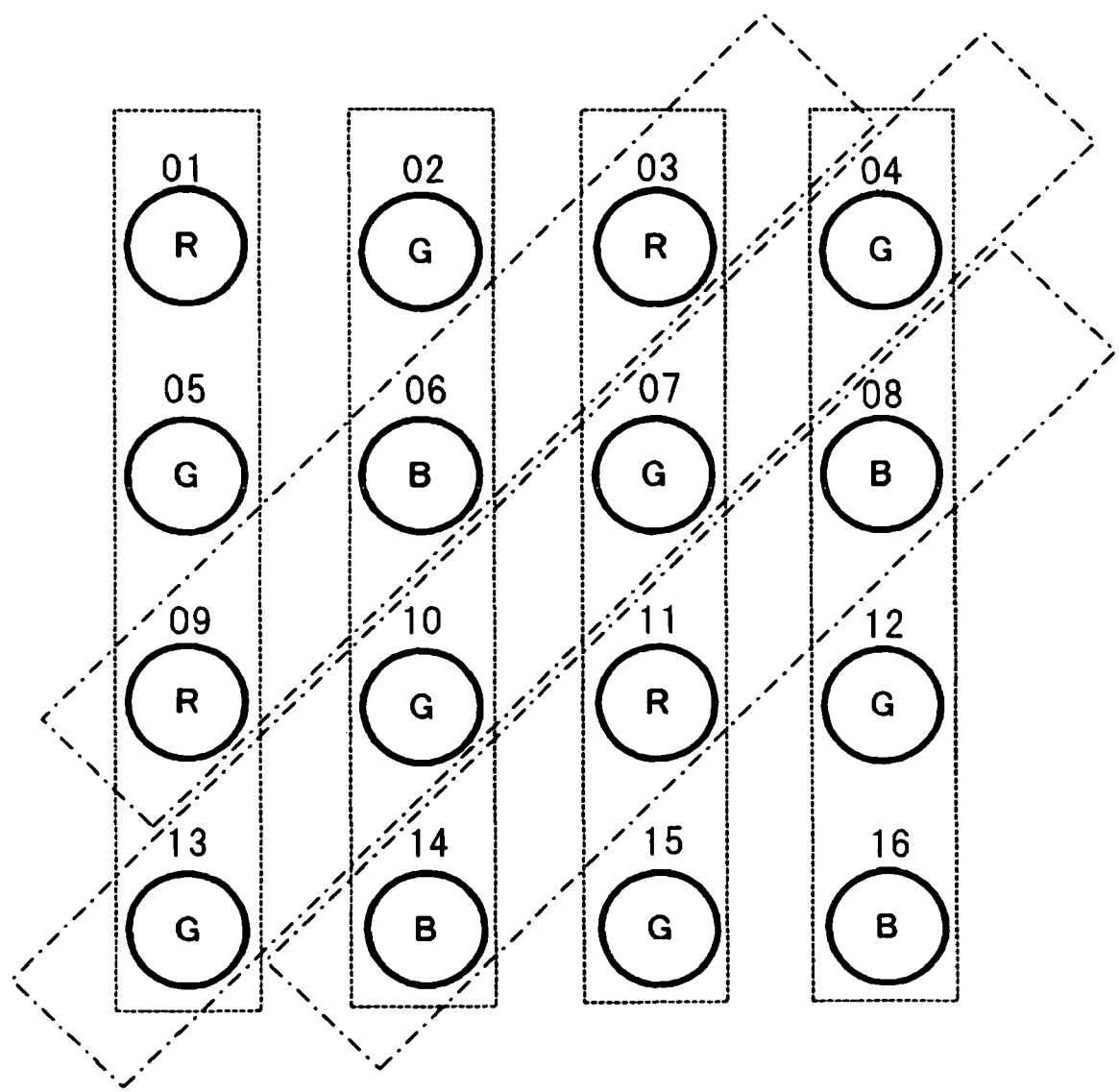
FIG. 5 is a view of the arrangement of added image pickup signals output from AFE shown in FIG. 2 and disposed in a memory.

FIG. 4 is a view of the arrangements of image pickup signals arranged in the memory when such adding processing is enforced. In FIG. 4, rectangles, in each of which "R+" is stated, respectively express the R+ signals that are obtained by adding R signals obtained from the photoelectric conversion element 1, rectangles, in each of which "G+" is stated, respectively express the G+ signals that are obtained by adding G signals obtained from the photoelectric conversion element 2 and rectangles, in each of which "R+" is stated, respectively express the B+ signals that are obtained by adding B signals obtained from the photoelectric conversion element 3.

For example, as shown in FIG. 4, after adding G01, G03, G17 and G19 in FIG. 3 together, added G+ signal is arranged at a pixel position 10 which is a central location among G01, G03, G17 and G19. After adding R02, R04, R18 and R20 together, added R+ signal is arranged at a pixel position 11 which is a central location among R02, R04, R18 and R20. And, adding B09, B11, B25 and B27 together, added B+ signal is arranged in a pixel position 18 which is a central location among B09, B11, B25 and B27. Also, adding G10, G12, R26 and G28 together, added G+ signal is arranged at a pixel position 19 which is a central location among G10, G12, G26 and G28.

As stated above, by adding color signals having the same color component together, two G+ signals, one R+ signal and one B+ signal are generated in a rectangular area including pixel positions 01, 04, 28, 25 as respective corners shown in FIG. 4. Now, description will be given below of a synchronization processing applied to the arrangement of image signals as shown in FIG. 4.

The synchronization processing unit 12 checks in which direction a large number of color signals arranged in the memory have a correlation between them by using, for example, the W signals that adjoin their respective image signals. And, for the color signals having a correlation in the Z direction or in a direction perpendicular to the Z direction, there are interpolated R signals, G signals and B signals by using a luminance-use-estimating processing. Here, the luminance-use-estimating processing is a processing which estimates color signals to be interpolated at pixel positions where such image pickup signals exist, using (i) the same kinds of color signals as the color signals to be interpolated existing in the peripheries of such pixel positions and (ii) W signals existing in peripheries of such pixel positions.

Also, for image pickup signals which have a correlation between them in the X direction or in the Y direction, the synchronization processing unit 12 interpolates R signals, G signals and B signals by using a G-use-estimating processing. Here, the G-use-estimating processing is a processing in which color signals to be interpolated at pixel positions where the image pickup signals exist are estimated by using (i) color signals which exist in the peripheries of the above-mentioned pixel positions and are of the same kinds as those of the color signals to be interpolated and (ii) G signals which exist in the peripheries of the above-mentioned pixel positions.

Firstly, when checking the direction of the correlation of G+10 shown in FIG. 4, the synchronization processing unit 12 calculates the following four directions, that is, the Y direction: (W05+W13)/2−(W06+W14)/2, X direction: (W05+W06)/2−(W13+W14)/2, Z direction: (W06−W13), and a direction perpendicular to the Z direction: (W05−W14). And, the synchronization processing unit 12 determines that a direction, where the absolute value of the calculation results is smallest, is a direction having a correlation with G+10.

(Method 1: when Z Direction Having a Correlation)

(a) When Interpolating R Signal at a Pixel Position 10

In this case, the synchronization processing unit 12 estimates R signal to be interpolated using the luminance-use-estimating processing. When interpolating R signal (R10) at a pixel position 10, on the premise that, in an object having a correlation in the Z direction, differences between W and R signals in the local area of an image are equal, it can be expressed that, using before-added R signals, $$R10-W10=\{(R02-W02)+(R04-W04)+(R18-W18)+(R20-W20)\}/4 \quad (28).$$

Also, 'R+11'=(R02+R04+R18+R20), so R10 can be estimated by carrying out the following expression (29) which is deformed expression (28).

$$R10=W10+\{`R+11`-W02-W04-W18-W20\}/4 \quad (29).$$

Specifically, the synchronization processing unit 12 estimates W02, W04, W18, W20 and W10 using vicinity signals existing in the vicinity of respective luminance signals.

For example, W02=(W05+Wb)/2, W04=(W07+Wd)/2, W18=(W21+W14)/2, W20=(W16+W23)/2 and W10=(W13+W06).

Therefore, the expression (29) can be deformed to the following expression (30). R10 can be estimated by the expression (30).

$$R10=(W13+W06)/2+\{`R+11`-(W05+Wb)/2-(W07+Wd)/2-(W21+W14)/2-(W16+W23)/2\}/4 \quad (30).$$

(b) When Interpolating B Signal at a Pixel Position 10

In this case, the synchronization processing unit 12 estimates B signal to be interpolated using the luminance-use-estimating processing. When interpolating B signal (B10) at a pixel position 10, on the premise that, in an object having a correlation in the Z direction, differences between W and B signals in the local area of an image are equal, it is expressed that, using before-added B signals, $$B10-W10=\{(B09-W09)+(B11-W11)+(B25-W25)+(B27-W27)\}/4 \quad (31).$$

Also, 'B+18'=(B09+B11+B25+B27), so B10 can be estimated by carrying out the following expression (32) which is deformed expression (31).

$$B10=W10+\{`B+18`-W09-W11-W25-W27\}/4 \quad (32).$$

Since expression (32) can be deformed to the following expression (33) in a similar way of the case (a), B10 can be estimated by the expression (33).

$$B10=(W13+W06)/2+\{`B+18`-(Wf+W05)/2-(W14+W07)/2-(Wh+W21)/2-(W30+W23)/2\}/4 \quad (33).$$

(c) When Interpolating G Signal at a Pixel Position 10

In this case the synchronization processing unit 12 estimates G signal to be interpolated using the luminance-use-estimating processing. When interpolating G signal (G10) at a pixel position 10, on the premise that in an object having a correlation in the Z direction, differences between W and G signals in the local area of an image are equal, that is, it is expressed that, using before-added B signals, $$G10-W10=\{(G01-W01)+(G03-W03)+(G17-W17)+(G19-W19)\}/4 \quad (34).$$

Also, 'G+10'=(G01+G03+G17+G19), so G10 can be estimated by carrying out the following expression (35) which is deformed expression (34).

$$G10=W10+\{`G+10`-W01-W03-W17-W19\}/4 \quad (35).$$

Since expression (35) can be deformed to the following expression (36) in a similar way of the case (a), G10 can be estimated by the expression (36).

$$G10=(W13+W06)/2+\{`G+10`-(We+Wa)/2(W06+Wc)/2-(Wg+W13)/2-(W22+W15)/2\}/4 \quad (36).$$

(Method 2: when Y Direction Having a Correlation)

(a) When Interpolating R Signal at a Pixel Position 10

In this case, the synchronization processing unit 12 estimates R signal to be interpolated using the G-use-estimating processing. When interpolating R signal (RIO) at a pixel position 10, on the premise that, in an object having a correlation in the Y direction, differences between G and R signals in the local area of an image are equal, that is, it can be expressed that, using before-added G signals and R signals, $$R10-G10=\{(R02-G02)+(R04-G04)+(R18-G18)+(R20-G20)\}/4 \quad (37).$$

Also, 'R+11'=(R02+R04+R18+R20), so R10 can be estimated by carrying out the following expression (38) which is deformed expression (37).

$$R10=G10+\{`R+11`-G02-G04-G18-G20\}/4 \quad (38).$$

Specifically, the synchronization processing unit 12 estimates G02 using vicinity signals existing of G02 in the direction Y. For example, G02 can be estimated by the expression, G02=G10. In a similar way, G signals can be estimated by the following expressions, G04=G12, G18=G26, G20=G28. And G10 in the central location among G01, G03, G17 and G19 equals 'G+10'/4.

Further, 'G+19'=(G10+G12+G26+G28), so R10 can be estimated by carrying out the following expression (39) which is deformed expression (38).

$$R10=`G+10`/4+\{`R+11`-`G+19`\}/4 \quad (39).$$

(b) When Interpolating B Signal at a Pixel Position 10

In this case, the synchronization processing unit 12 estimates B signal to be interpolated using the G-use-estimating processing. When interpolating B signal (B10) at a pixel position 10, on the premise that, in an object having a correlation in the Y direction, differences between B and G signals in the local area of an image are equal, that is, it can be expressed that, using before-added G signals and R signals, $$B10-G10=\{(B09-G09)+(B11-G11)+(B25-G25)+(B27-G27)\}/4 \quad (40).$$

Further, "B+18"=(B09+B11+B25+B27), so B10 is estimated by the following expression (41) which is deformed expression (40).

$$B10=G10+\{"B+18"-G09-G11-G25-G27\}/4 \quad (41).$$

Since the expression (41) can be deformed to the following expression (42) in a similar way of the above case (a), B10 can be obtained from the following expression (42), that is, $$B10=`G+10`/4+\{`B+18`-`G+10`\}/4 \quad (42).$$

(c) When Interpolating G Signal at a Pixel Position 10

In this case, the synchronization processing unit 12 let "G+10/4" be a G signal.

As stated above, even when adding color signals having the same color or charges relating to the same color, false color reduction effect can be expected by enforcing a correlation calculation in a horizontal, vertical and oblique directions. And as color resolutions become less matter than luminance resolution, reading rate can be decreased with less effect to image quality by reading out after-added charges. And by adding signals after outputting them, the number of color pixels to be calculated can be decreased. Also, in the example shown in FIG. 4, a low-resolution image having the same resolution in horizontal and vertical directions can be obtained.

In addition, as another adding method, a adding method in which color signals having the same color component and adjoining each other in the X direction, and a adding method in which color signals having the same color component and adjoining each other in the Y direction can be employed. For example, there is enforced a processing in which a G signal obtained by adding G01 and G17 shown in FIG. 3 is arranged in a pixel position 09, (ii) a R signal obtained by adding R02 and R04 shown in FIG. 3 is arranged in a pixel position 03, thereby may generate color image data having half pixel data as many as color image data obtained from FIG. 3.

And it may be possible to add R signals, add B signals, not add G signals. In this case, since G signals having a high correlation with luminance aren't added, W signals and G signals are arranged in a diamond pattern. High resolutions can be obtained in horizontal and vertical directions. Also, the number of pixels is decreased by adding R signals and B signals respectively, thereby make it possible to decrease calculation-cost and reading-cost, and to improve sensitivity.

Interpolating R signals and B signals corresponds to the aforementioned interpolating processing with adding processing, on the other hand, interpolating G signals corresponds to the aforementioned interpolating processing without adding processing, whereby R signals and B signals are interpolated at a pixel position which R signals and B signals are added respectively, and G signals are interpolated at the all pixel positions before adding. When interpolating R signals and B signals at the all pixel positions, G-use-estimating processing is employed using G signals interpolated at the all pixel positions. More specifically, differences are obtained by G signals at pixel positions at which added R signals and B signals which are subtracted from added R signals and B signals respectively. And the obtained differences are averaged as to respective colors. And then, R signals and B signals to be interpolated can be obtained by adding the averaged differences to G signals at respective pixel positions.

And, here, adding processing of color signals are enforced in the memory, added color signals may be output from the image pickup device 10 by adding charges read from photo-electric conversion elements when driving the image pickup device 10.

In this case, the image pickup device 10 is a type of CCD (Charge Coupled Device). More specifically, the image pickup device 10 is structured such that (i) charges are read out from photoelectric conversion elements to vertical-charge-transfer paths and transferred in the Y direction, (ii) the transferred charges are further transferred through horizontal-charge-transfer paths in the X direction, and (iii) an output unit (1) converts the transferred charges to corresponding signals according to their charge amount and (2) outputs the signals. And a driving unit that drives the image pickup device for, as to the charges read out from the photoelectric conversion elements, (i) adding, in the vertical-charge-transfer paths and the horizontal-charge-transfer paths, charges having the same color component adjoining in (a) the X direction, (b) the Y direction or (c) the X direction and the Y direction and (ii) outputting color signals according to the added charges.

What is claimed is:

1. A signal processing apparatus for processing image pickup signal output from image pickup elements and generating color image data, the image pickup signal including three kinds of color signals and luminance signals, the signal processing apparatus comprising:
   a synchronization processing unit that disposes signals included in the image pickup signal at respective coordinate positions, and carries out a interpolating processing that interpolates to the three kinds of color signals at the pixel positions which indicate the respective coordinate positions corresponding to pixel data of the color image data to be generated,
   wherein the interpolating processing of the color signals to be carried out by the synchronization processing unit includes a luminance-use-estimating processing that estimates at each pixel position corresponding to one of three kinds of color signals, another one kind of color signals to be interpolated by using
   (i) color signals having said another one kind of color signals and existing around the pixel position of said one kind of color signals and
   (ii) the luminance signals around the pixel position of said one kind of color signals.

2. The signal processing apparatus according to claim 1, wherein the image pickup signal include: first color signals, second color signals and third color signals as the three kinds of color signals; and the luminance signals
   the image pickup signal disposed at the respective coordinate positions are structured such that first lines including some of the luminance signals and the first color signals arranged in a given direction and second lines including the other of the luminance signals, the second color signals and the third color signals arranged in the given direction are arranged alternately in a perpendicular direction perpendicular to the given direction,
   each pixel position indicates the position coordinate at which one of the color signals is arranged,
   the synchronization processing unit interpolates, using the luminance-use-estimating processing, as to each pixel position where the color signal having a correlation in the given direction exists, (i) a first color signal to be interpolated at the pixel position of each second color signal, (ii) a first color signal to be interpolated at the pixel position of each third color signal and (iii) second and third signals to be interpolated in the pixel position of each first signal, and
   the luminance-use-estimating processing is a processing that estimates:

(i) the first color signal to be interpolated at the pixel position of each second color signal, using (a) the luminance signal existing in the vicinity of the pixel position of each second color signal and included in the second line including the second color signal existing at the pixel position of each second color signal, (b) the luminance signal existing in the vicinity of the pixel position of each second color signal and included in the first line adjoining the second line, and (c) the first color signal existing in the vicinity of the luminance signal included in the first line adjoining the second line;

(ii) the first color signal to be interpolated at the pixel position of each third color signal, using (a) the luminance signal existing in the vicinity of the pixel position of each third color signal and included in the second line including the third color signal existing at the pixel position of each third color signal, (b) the luminance signal existing in the vicinity of the pixel position of each third color signal and included in the first line adjoining the second line, and (c) the first color signal existing in the vicinity of the luminance signal included in the first line adjoining the second line;

(iii) the second color signal to be interpolated at the pixel position of each first color signal, using (a) the luminance signal existing in the vicinity of the pixel position of each first color signal and included in the first line including the first color signal existing at the pixel position of each first color signal, (b) the second color signal existing in the vicinity of the pixel position of each first signal and included in the second line adjoining the first line, and (c) the luminance signal existing in the vicinity of the second color signal included in the second line; and (iv) the third color signal to be interpolated at the pixel position of each first color signal, using (a) the luminance signal existing in the vicinity of the pixel position of each first color signal and included in the first line including the first color signal existing at the pixel position of each first color signal, (b) the third color signal existing in the vicinity of the pixel position of each first signal and included in the second line adjoining the first line, and (c) the luminous signal existing in the vicinity of the third color signal included in the second line.

3. The signal processing apparatus according to claim 2, wherein the luminance-use-estimating processing, at the pixel position where the first color signal is to be interpolated, estimates:

(i) the first color signal to be interpolated at the pixel position of each second color signal by:
   (a) interpolating a luminance signal at the pixel position where the first color signal to be interpolated, using the luminance signal which exists in the vicinity of the pixel position of each second color signal and is included in the second line including a color signal existing at the pixel position of each second color signal,
   (b) interpolating at a first adjoining-pixel-position which is a pixel position adjoining the pixel position of each second signal in the perpendicular direction, a first color signal using the first color signal which exists in the vicinity of the first adjoining-pixel-position and is included in the first line including the luminance signal existing at the first adjoining-pixel-position, and
   c) adding, to the luminance signal interpolated at the position of each second color signal, a difference between the first color signal interpolated at the first adjoining-pixel-position and the luminance signal existing at the first adjoining-pixel-position
(ii) the first color signal to be interpolated at the pixel position of each third color signal by:
  (a) interpolating a luminance signal at the pixel position of each third color signal, using the luminance signal which exists in the vicinity of the pixel position of each third color signal and is included in the second line including a color signal existing at the pixel position of each third color signal,
  (b) interpolating at another first adjoining-pixel-position which is a pixel position adjoining the pixel position of each third signal in the perpendicular direction, a first color signal using the first color signal which exists in the vicinity of the another first adjoining-pixel-position and is included in the first line including the luminance signal existing at the first adjoining-pixel-position, and
  (c) adding, to the luminance signal interpolated at the position of each third color signal, a difference between the first color signal interpolated at the another first adjoining-pixel-position and the luminance signal existing at the another first adjoining-pixel-position;
(iii) the second color signal is to be interpolated at the pixel position of each first signal by:
  (a) interpolating a luminance signal at the pixel position of each first color signal, using the luminance signal which exists in the vicinity of the pixel position of each first signal and is included in the first line including a color signal existing at the pixel position of each first color signal,
  (b) interpolating a luminance signal at a second adjoining-pixel-position which is a pixel position where the second color signal which exists in the vicinity of the pixel position of each first signal and is included in the second line adjoining the first line, using the luminance signal existing in the vicinity of the second adjoining-pixel-position and included in the second line including the second color signal existing at the second adjoining-pixel-position, and
  (c) adding, to the luminance signal interpolated at the pixel position of each first position, a difference between the second color signal existing at the second adjoining-pixel-position and the luminance signal interpolated at the second adjoining-pixel-position; and
(iv) the third color signal to be interpolated at the pixel position of each first color signal by:
  (a) interpolating the luminance signal at the pixel position of each first color signal, using the luminance signal which exists in the vicinity of the pixel position of each first signal and is included in the first line including the color signal existing at the pixel position of each first color signal,
  (b) interpolating a luminance signal at a third adjoining-pixel-position which is a pixel position where the third color signal which exists in the vicinity of the pixel position of each first signal and is included in the second line adjoining the first line, using the luminance signal existing in the vicinity of the third adjoining-pixel-position and included in the second line including the third color signal existing at the third adjoining-pixel-position, and
adding, to the luminance signal interpolated at the pixel position of each first position, a difference between the third color signal existing at the third adjoining-pixel-position and the luminance signal interpolated at the third adjoining-pixel-position.

4. The signal processing apparatus according to claim 2, wherein the synchronization processing unit interpolates, using a luminance-no-use-estimating processing, (i) a third color signal to be interpolated at the pixel position where each second color signal exists and (ii) a second color signal to be interpolated at the pixel position where each third color signal exists, and
the luminance no-use-estimating processing is a processing that estimates:
(i) the third color signal to be interpolated at the pixel position of each second color signal, by using the same kind of color signal as the third color signal to be interpolated (a) existing in the vicinity of each second color signal and (b) included in the second line including a color signal existing at the pixel position of each second color signal; and
(ii) the second color signal to be interpolated at the pixel position of each third color signal, by using the same kind of color signal as the second color signal to be interpolated (a) existing in the vicinity of each third color signal and (b) included in the second line including a color signal existing at the pixel position of each third color signal.

5. The signal processing apparatus according to any one of claim 2,
wherein the color signal interpolating processing to be carried out by the synchronization processing unit includes a first-color-signal-use-estimating processing that estimates the color signal to be interpolated at each pixel position by using
(i) the same kind of color signal as the color signal to be interpolated existing around each pixel position and
(ii) the first color signal existing around each pixel position.

6. The signal processing apparatus according to claim 5, wherein the image pickup signal disposed at the respective coordinate positions are structured such that, when viewed in a crossing direction crossing the given direction and the perpendicular direction, third lines including some of the first color signals and the second color signals arranged in the crossing direction and fourth lines including the other of the first color signals and the third color signals arranged in the crossing direction are alternately arranged in a perpendicular direction perpendicular to the crossing direction with fifth lines including the luminance signals arranged in the crossing direction between the third and fourth lines,
the synchronization processing unit, interpolates, using the first-color-signal-use-estimating processing, as to each pixel position where the color signal having a correlation in the crossing direction exists, (i) a third color signal to be interpolated at the pixel position of each second color signal, (ii) a second color signal to be interpolated at the pixel position of each third color signal, (iii) a third color signal to be interpolated at the pixel position of each first color signal included in each third line, and (iv) a second color signal to be interpolated at a pixel position of each first color signal included in each fourth line,
the first-color-signal-use-estimating processing is a processing that estimates:
(i) the second color signal to be interpolated at the pixel position of each third color signal, using (a) the first color signal (a-1) existing in the vicinity of the pixel position of each third color signal and (a-2) included in the fourth line including a color signal existing at the pixel position of each third color signal, (b) the first color signal (b-1) existing in the vicinity of the pixel position of each third color signal and (b-2) included in the third line adjoining the fourth line, and (c) the second color signal existing in the vicinity of the first color signal included in the third line;

(ii) the third color signal to be interpolated at the pixel position of each second color signal, using (a) the first color signal (a-1) existing in the vicinity of the pixel position of each second color signal and (a-2) included in the third line including a color signal existing at the pixel position of each second color signal, (b) the first color signal b-1) existing in the vicinity of the pixel position of each second color signal and (b-2) included in the fourth line adjoining the third line, and (c) the third color signal existing in the vicinity of the first color signal included in the fourth line;

(iii) the third color signal to be interpolated at the pixel position of each first color signal included in the third line, using (a) each first color signal, (b) the third color signal (b-1) existing in the vicinity of the pixel position of each first color signal and (b-2) included in the fourth line adjoining the third line including each first color signal, and (c) the first color signal existing in the vicinity of the third color signal included in the fourth line; and (iv) the second color signal to be interpolated at the pixel position of each first color signal included in the fourth line, using (a) each first color signal, (b) the second color signal (b-1) existing in the vicinity of the pixel position of each first color signal and (b-2) included in the third line adjoining the fourth line, and (c) the first signal existing in the vicinity of the second color signal included in the fourth line.

7. The signal processing apparatus according to claim 6, wherein the synchronization processing unit interpolates using a first-color-signal-no-use-estimating processing,
(i) a first color signals respectively to be interpolated at the pixel position of each second color signal and the pixel position of each third color signal, (ii) a second color signal to be interpolated at the pixel position of each first color signal included in the third line, and (iii) a third color signal to be interpolated at a position of each first color signal included in the fourth line,
the first-color-signal-no-use-estimating processing is a processing estimates:
(i) the first color signal to be interpolated at the pixel position of each second color signal, using the first color signal existing in the vicinity of each second color signal included in the third line including each second color signal;
(ii) the first color signal to be interpolated at the pixel position of each third color signal, using the first color signal existing in the vicinity of the third color signal included in the fourth line including each third color signal;
(iii) the second color signal to be interpolated at the pixel position of each first color signal included in the third line, using the second color signal existing in the vicinity of each first color signal included in the third line; and
(iv) the third color signal to be interpolated at the pixel position of each first color signal included in the fourth line, using the third color signal existing in the vicinity of the first color signal included in the fourth line.

8. The signal processing apparatus according to claim 2, wherein the first color signal is a green color signal, the second color signal is a red color signal, and the third color signal is a blue color signal.

9. The signal processing apparatus according to claim 2, wherein the image pickup device includes:
a first group containing color detecting photoelectric conversion elements for detecting light color components respectively corresponding to the respective first, second and third color signals; and
a second group containing luminance detecting photoelectric conversion elements for detecting light luminance components respectively corresponding to the luminance signals; and
the photoelectric conversion elements included in the first group, when the positions of the respective photoelectric conversion elements included in the second group are regarded as the reference position, are disposed shifted in a shifted direction from the reference position in such a manner that one of the photoelectric conversion elements included in the first group can adjoin the photoelectric conversion elements included in the second group.

10. The signal processing apparatus according to claim 1, wherein the synchronization processing unit (1) adds the same kind of signals together adjoining in (i) a given direction, (ii) a perpendicular direction perpendicular to the given direction or (iii) the given direction and the perpendicular direction for decreasing the numbers of three kinds of color signals and (2) disposes the image pickup signal at respective coordinate positions.

11. The signal processing apparatus according to claim 1, wherein the image pickup device includes a plurality of photoelectric conversion elements for detecting the color signals,
the three kinds of color signals are obtained by a driving processing that (1) adds charges (a) obtained from the photoelectric conversion elements and (b) having the same color components together adjoining in (i) a given direction, (ii) a perpendicular direction perpendicular to the given direction or (iii) the given direction and the perpendicular direction for decreasing the numbers of charges, and (2) outputs color signals according to the added charges.

12. The signal processing apparatus according to claim 10, wherein the three kinds of color signals are green color signals, red color signals, and blue color signals, and
the synchronization processing unit that adds as to red color signals and blue color signals.

13. The signal processing apparatus according to claim 11, wherein the three kinds of color signals are green color signals, red color signals, and blue color signals, and
the red color signals and blue color signals are obtained through the adding.

14. A image pickup apparatus, comprising:
the image pickup elements; and
the signal processing apparatus according to claim 1.

15. A non-transitory computer readable medium storing a program causing a computer to execute a process for processing image pickup signal and generating a color image data, the image pickup signal output from an image pickup device and including three kinds of color signals and luminance signals the process comprising:
disposing signals included in the image pickup signal at respective coordinate positions,
and carrying out a interpolating processing that interpolates to the three kinds of color signals at a pixel position which indicates each coordinate position corresponding to a pixel of the color image data to be generated, wherein the interpolating processing of the color signals to be carried out by the synchronization processing unit includes a luminance-use-estimating processing that estimates at each pixel position corresponding to one of three kinds of color signals, another one kind of color signals to be interpolated by using (i) color signals having said another one kind of color signals and existing around the pixel position of said one kind of color signals and (ii) the luminance signals around the pixel position of said one kind of color signals.

* * * * *